April 12, 1966    J. J. SCOLARO    3,245,139
METHOD OF REPAIRING CORRUGATED TUBING ABOUT A CORE
Filed Aug. 19, 1964    2 Sheets-Sheet 1
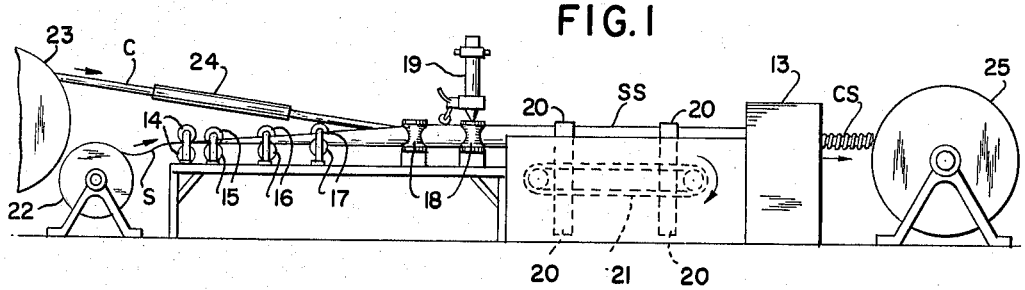
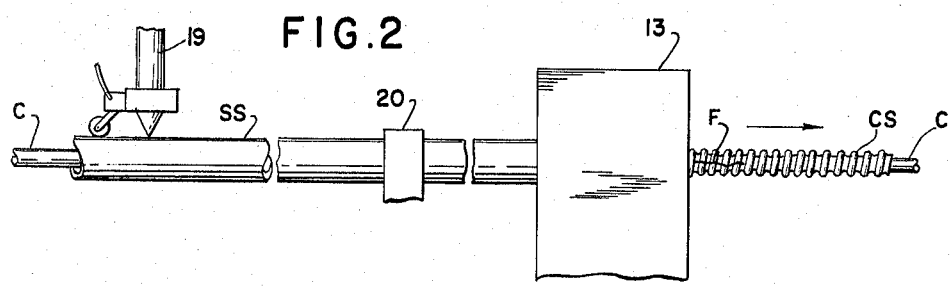
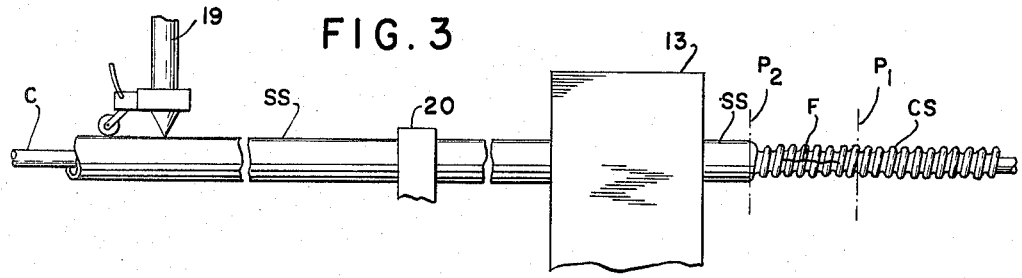
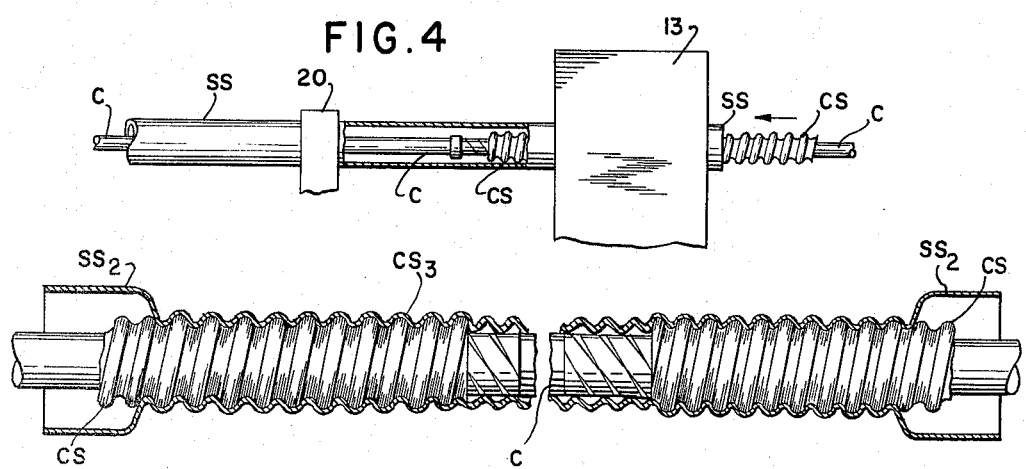
INVENTOR.
JOHN J. SCOLARO
BY
McLean and Boustead
ATTORNEYS April 12, 1966   J. J. SCOLARO   3,245,139
METHOD OF REPAIRING CORRUGATED TUBING ABOUT A CORE
Filed Aug. 19, 1964   2 Sheets-Sheet 2
FIG.5
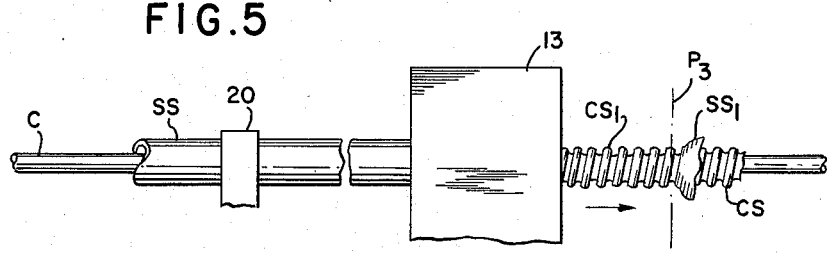
FIG.6
FIG.7
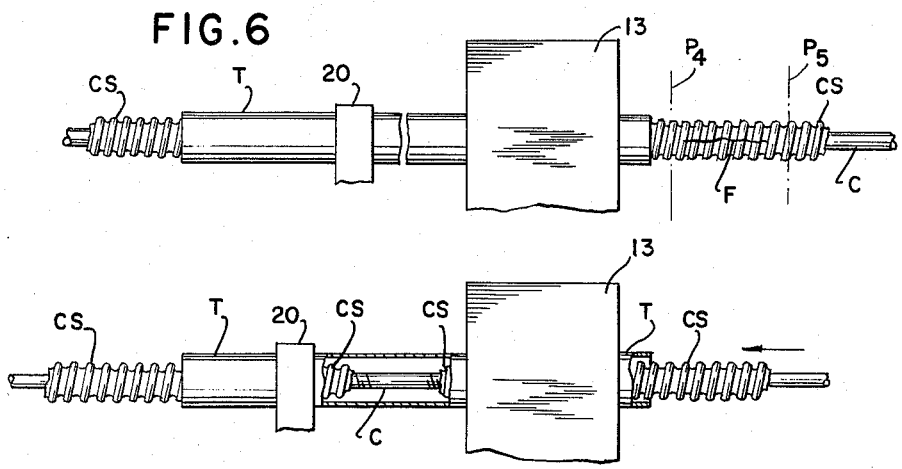
FIG.8
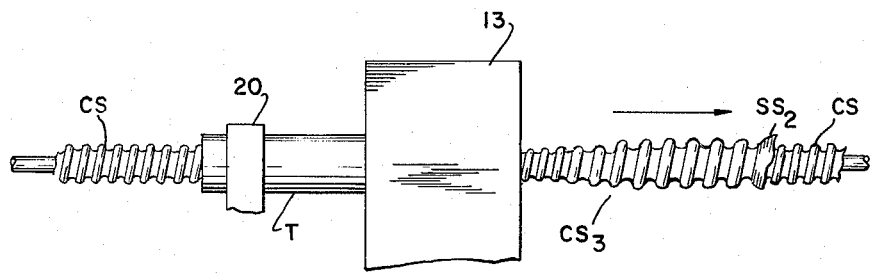
INVENTOR.
JOHN J. SCOLARO
BY
McLean and Boustead
ATTORNEYS

United States Patent Office 3,245,139
Patented Apr. 12, 1966

3,245,139
METHOD OF REPAIRING CORRUGATED TUBING ABOUT A CORE
John J. Scolaro, Reading, Mass., assignor to Simplex Wire and Cable Company, Cambridge, Mass., a corporation of Massachusetts
Filed Aug. 19, 1964, Ser. No. 390,645
3 Claims. (Cl. 29—401)

This invention relates to the manufacture of corrugated metallic tubing used as sheating for electric cables and in particular provides a method by which faults in such sheathing can be repaired.

As disclosed in Lehnert Patent No. 3,023,300, electric cable having transversely corrugated metallic sheathing can be prepared by bringing strip material formed of the metal to be employed as a sheathing adjacent to an electric conductor assembly which is to form the core of the cable. The strip material and core are then passed simultaneously lengthwise and parallel to each other continuously along a path in sequence through a tube-forming position, a tube gripping position and a tube corrugating position. In the tube forming position, the strip material is folded about the cable core axially to form a tubular shape in which the longitudinal edges of the strip material are adjacent to each other and define a lengthwise split in the tube thus formed. In the tube foming operation the longitudinal split is also sealed, for example by welding, to form a longitudinal seam on the tube. The tube containing the core is then passed through a gripping position in which a "puller" grasps the tube to prevent any rotation of the tube about its axis and simultaneously "pulls" the tube to pass it on to the final corrugating position in which lateral corrugations, which can be either helical or circular, are imparted to the tube to form it into corrugated tubing, the valleys of which are firmly pressed against the core. A corrugating device such as shown in Penrose Patent No. 2,817,363 can suitably be employed. In this device the corrugations are imparted helically by rotating several canted rollers about the surface of the tubing, the rollers being radially displaced from the axis of the tubing an appropriate distance to impart the desired depth of corrugations.

It frequently happens in the formation of such corrugated sheathing about a cable core that a fault occurs midway in the processing of a considerable length such that the remaining lengths of unfaulted cable are not sufficiently long to meet the specifications for sale. In such cases it has been the practice in the past to remove the entire sheath and repeat the sheathing operation with a resulting considerable loss in labor, time and scrapped sheathing metal. Such faults are usually caused by burn-through during the welding operation, by a collapsed weld or by a broken mill splice, and typically have the form of a caved-in line running almost lengthwise of the cable.

Although there are two general situations, i.e. that which obtains when the fault is discovered at the time of its occurrence and the situation which obtains when the fault is subsequently discovered after a length of the cable is completely sheathed, the general repair technique in accordance with the present invention is basically the same. In each instance, advantage of the proximity of the puller and corrugator in the normal cable sheathing line is utilized to permit resheathing of a faulted section of the cable from which the faulted sheathing has been removed. Thus, in accordance with the present invention, when the fault has been located in the corrugated sheathing of a cable, the section of the cable containing the fault is cut away and removed from about the core. Uncorrugated tubing is then positioned in the puller and corrugator, and the core and the remaining corrugated sheathing are then drawn through the uncorrugated tubing to a position in which the end of a length of unfaulted corrugated sheathing remaining next to the section of core which has been exposed by removal of the faulted section of sheathing lies between the corrugator and puller within the uncorrugated tubing. Such length of unfaulted corrugated sheathing extends about the core and within the uncorrugated tubing through the corrugator. The corrugating operation is then recommenced passing the uncorrugated tubing overlying the unfaulted corrugated sheathing and cable core through the corrugator which is adjusted to corrugate the uncorrugated tubing over the unfaulted corrugated sheathing in register with the corrugations of such sheathing and thereafter over the previously exposed core from which the faulted section of sheathing was removed.

For a more complete understanding of the practical application of this invention reference is made to the appended drawings in which:

FIGURE 1 is a diagrammatic elevation of a cable sheathing line utilized in the application of corrugated metallic sheathing to a cable core;

FIGURE 2 is a fragmentary view similar to FIGURE 1 illustrating the occurrence of a fault during the formation of cable sheathing;

FIGURE 3 is a view similar to FIGURE 2 illustrating a step in one variation of the repair method of this invention;

FIGURE 4 is a view similar to FIGURE 3 illustrating another step in the repair method of this invention;

FIGURE 5 is a view similar to FIGURE 4 illustrating yet a further step in the repair method of this invention;

FIGURE 6 is a view similar to FIGURES 3, 4 and 5 illustrating a step in another variation of the repair method of this invention;

FIGURE 7 is a view similar to FIGURE 6 showing another step in the repair method of this invention;

FIGURE 8 is a view similar to FIGURE 7 showing yet a further step in the repair method of this invention; and FIGURE 9 is a partially cut-away, sectional view of a length of cable repaired in accordance with this invention prior to final trimming.

Referring more particularly to FIGURE 1, the apparatus typically used in applying transversely corrugated metallic sheathing to electric cables is generally indicated by the reference numeral 10, and fundamentally includes a tube former 11, a puller 12 and a corrugator 13.

Tube former 11 is of generally conventional construction and includes a series of rolls arranged in mating pairs 14, 14, 15, 15, 16, 16, and 17, 17 disposed along a horizontal path for feeding and progressively bending between them a metal strip S drawn, for example, from a payoff spool 22. A final pair of cooperating rolls 18, 18 (only one of which is visible in FIGURE 1) serve to hold the folded sheath S in tubular shape with its longitudinal edges butting while a core C consisting of an electric conductor construction is fed through a core tray 24 positioned above rolls 14, 14, 15, 15, and 16, 16 from a core payoff spool 23 intto the tube formed of strip S in the V-shaped opening between the longitudinal edges of strip S which is formed between rolls 17, 17 and rolls 18, 18.

The longitudinal split formed between the butting longitudinal edges of strip S is sealed to form a longitudinal seam by means of a welder 19 which can be of the type described in U.S. Patent No. 2,760,042.

The sealed tube, designated by the reference letters SS, is then drawn into puller 12, which is a split-clamp caterpillar, including a series of horizontal reciprocable split clamps 20 mounted on an endless belt 21 for moving with clamps 20 in clockwise direction, as seen in FIGURE 1. Clamps 20, as they move along the path of welded tubes SS in the direction from tube former 11 to corrugator 13, are clamped tightly about tube SS to draw it in such direction and to prevent its rotation about its axis. Clamps 20, as they leave the path of tube SS, are of course parted to release tube SS before they make their return path.

Welded tube SS passes from puller 12 to corrugator 13 in which, in the illustrated case, a continuous helical corrugtion is formed in sheath SS to form a corrugated sheath CS about core C in which the valleys of the corrugations are in firm contact with the surface of core C. Corrugated sheathing CS containing core C is taken from corrugator 13 to a take-up spool 25. Corrugator 13, as indicated above, can be of the roller type as disclosed in Penrose Patent No. 2,817,363. Alternatively, it can be of the floating ring type or any other type capable of imparting a transverse corrugation which is so constructed that it can also be utilized to permit passage of smooth pipe such as welded tube SS through corrugator 13 when desired.

Referring more particularly to FIGURE 2, which is an enlarged fragmentary portion of FIGURE 1 showing only a welded tube SS, core C, welder 19, a split-clamp 20, corrugator 13 and corrugated sheath CS, the occurrence of a typical fault F is illustrated as a caved-in line running lengthwise of corrugated sheath CS as it emerges from corrugator 13. When the occurrence of such a fault F or any other fault is observed, in accordance with this invention, the sheathing operation is shut down, that is, the entire operation illustrated in FIGURE 1 is stopped.

At this point the corrugating tools in corrugator 13 are neutralized such that upon further movement of welded tube SS through corrugator 13 no corrugations will be imparted to its surface. The sheathing operation is then started up again and reduced to a relatively slow speed, typically on the order of 12 feet per minute in the case of one or two inch diameter sheathing SS. As illustrated in FIGURE 3, which otherwise conforms to FIGURE 2, starting up the sheathing line again results eventually in welded tube SS being formed and carried past corrugator 13 such that the section of corrugated sheathing CS containing fault F is clear of corrugator 13. The sheathing operation is then stopped again, making a good stop, that is, with good weld under strip 19, the amperage of welding current and speed of the machine being reduced accordingly until the sheathing line stops dead.

The faulted section of corrugated sheathing CS is then ring cut, one cut being made, as indicated in FIGURE 3 at a point $P_1$ in corrugated sheathing CS on the side of fault F remote from corrugator 13, and the other cut being made at a point $P_2$ in welded tube SS between fault F and corrugator 13. In ring cutting the section of corrugated sheathing containing fault F, care should be taken not to damage the cable core C with the cutting tool. The section of sheathing CS containing fault F is then removed to expose core C. Any burrs and sharp edges are removed, and loose metal is cleaned out from the ring cut area. Any oil present on sheathing CS or welded tube SS where ring cut is cleaned off with a solvent such as chlorothene. The thirteenth corrugation from the ring cut end of corrugated sheathing CS is then marked for later reference purposes. Barrier tape, such as 0.003″ to 0.005″ thick "Mylar" tape is then wrapped about core C with an overlap beneath the ring cut ends each of welded tube SS and of corrugated sheath CS a distance approximating the diameter of the tube CS in each direction from the ring cut and is bound in place with an adhesive electrical tape.

Without operating either puller 12 or corrugator 13, corrugated sheath CS together with core C is then inserted into smooth pipe SS by pulling the unsheathed portion of core C back through the machine until good corrugated sheathing CS is up to the corrugator. 8 to 12 corrugations should be inserted into welded tube SS using the 13th marked corrugation for reference purposes. The corrugator ring or other corrugating tool of corrugator 13 is then returned to its original setting used in making corrugated sheathing CS, making sure that the tool is bearing on the center of a corrugation in the underlying corrugated sheathing CS. Making sure that the entire sheathing line is then ready to proceed, operation is recommenced with the amperage to the welder and sheathing speed each increased until operating speed is again achieved.

Referring to FIGURE 5, it will be observed that as the normal smooth welded tube SS emerges from corrugator 13 an uncorrugated fragment at its end, indicated by the reference symbol $SS_1$, emerges overlying corrugated sheathing CS, with the remainder of tube SS as corrugated sheathing with a portion, designated $CS_1$, overlying the previously corrugated sheathing CS, having its corrugations in register with the corrugations of the underlying previously corrugated sheathing CS, and a portion, designated by the reference symbol $CS_2$, overlying core C where the faulted section of corrugated sheathing CS was removed and thereafter overlying the remainder of core C as the tube forming, pulling and corrugating operations proceed in a normal manner.

When the particular length of core C is fully sheathed, end $SS_1$ of corrugated sheath $CS_2$ is ring cut and removed from underlying sheathing CS, as for example, indicated at line $P_3$ in FIGURE 5, making sure that underlying sheathing CS is not damaged by the cutting tool. The ring cut end is then filed and cleaned. Non-acid solder flux is then applied, and the joint is soldered in a conventional manner, utilizing a soft silver solder in the case of copper sheathing. The joint is then washed, wiped clean, dressed with a file, if necessary, and finally cleaned using an organic solvent such as chlorothene. Because of the relatively thin metal strip S employed in a sheathing line, such as described with reference to FIGURE 1, the resultant lapping of corrugated sheathing is barely noticeable and exhibits electrical continuity and fluid integrity not measurably different from unfaulted sheathing even after severe bending.

At times a fault such as fault F, described with reference to FIGURE 2 occurs without being detected until after the length of core C is sheathed, or at times it is impractical to stop the sheathing operation and the length of core C is fully processed allowing the section of corrugated sheathing CS containing fault F to remain in the completed cable. In such cases, fault F is located on the completely sheathed cable. A length of tube T typically cut from a section of welded tube SS which has been made without applying it over a core C is then placed in puller 12 and corrugator 13 such that a clamp 20 secures tube T firmly in place and such that the end of tube T emerges from corrugator 13 on its side remote from puller 12. The other end of tube T is flared slightly, and the sheathed cabel containing fault F is pulled through tube T, as indicated in FIGURE 6, to a point at which fault F is exposed adjacent corrugator 13. Sheath CS is then cut on both sides of fault F, as indicated by the reference symbols $P_4$ and $P_5$, and the faulted section is removed to expose core C. Care should be taken in cutting the sheath that the remaining corrugated sections are not damaged and that the core is not damaged. The ring cut ends of sheath CS are then cleaned, and the core is protected by barrier tapes beneath them, as described with reference to the FIGURE 3.

The cable is run into tube T (see FIGURE 7) until at least 8 to 12 corrugations of sheath CS on both sides of the section of core C from which the faulted section of sheath was removed are within tube T. It will be noted that tube T should be selected of a length sufficient to permit this. The corrugating tool of corrugator 13 is then set to make corrugations of the same depth and pitch as in sheath CS and in registry with such corrugations. Puller 12 and corrugator 13 are then started up to push the cable through corrugator 13 which corrugates tube T, as shown in FIGURE 9, to form a corrugated sheath $CS_3$ the corrugations of which register with the underlying corrugations of the cut ends of sheath CS to a distance of at least 8 to 12 corrugations over each end and cover the exposed core C where the section of sheath CS containing fault F was removed. The sheathing line is then stopped, the corrugating tool is neutralized, and the cabel is withdrawn from puller 12 and corrugator 13. As shown in FIGURE 9, the resultant corrugated sleeve $CS_3$ will normally have at each end a section $SS_2$ which remains uncorrugated. These are then removed as described with reference to section $SS_1$, cleaned, soldered, and then cleaned again, also as described with reference to the finishing of the lapped corrugated sheathing repair described with reference to FIGURES 3, 4 and 5.

I claim:
1. A method for repairing a fault in corrugated tubing formed about a core by a process in which an indefinite length of strip material and an indefinite length of core are simultaneously passed lengthwise and parallel to each other continuously along a path in sequence through a tube forming position, a tube gripping position, and a tube corrugating position, and which process includes acting on said strip material as it passes through said tube forming position to fold the opposite longitudinal edges of said strip together about said core thereby forming a tube of said strip material having a longitudinal split defined by said edges and to seal said split thereby forming a longitudinal seam on said tube, acting on said tube at said gripping position to hold said tube against rotational movement relative to the axis of said tube and to pull said tube from said tube forming position toward said corrugating position, and acting on said sealed tube at said corrugating position to form lateral corrugations about said tube in which the valleys of said corrugations firmly grip said core, which method includes locating a said fault in said corrugated tubing, removing a section of said corrugated tubing containing said fault from about said core, positioning a length of uncorrugated tubing extending between said gripping position and said corrugating position, drawing said corrugated tubing into said uncorrugated tubing to locate within said uncorrugated tubing said exposed core portion from which said faulty section was removed with an end of said corrugated tubing adjacent the portion thereof removed from said core, located between said gripping position and said corrugating position and with the non-faulty corrugated tubing extending through said corrugating positions thereafter passing said uncorrugated tubing and said corrugated tubing together while acting on said uncorrugated tubing at said corrugating position to corrugate said uncorrugated tubing in register with the underlying corrugations of said corrugated tubing and thereafter to corrugate said uncorrugated tubing overlying said exposed core.

2. A repair method according to claim 1 in which said fault is located along a length of said corrugated tubing after the manufacture thereof, said uncorrugated tubing is of fixed length, said corrugated tubing is drawn into said uncorrugated tubing with said exposed core portion positioned in said uncorrugated tubing and with non-faulty corrugated tubing on each side of said exposed core portion underly each end of said uncorrugated tubing whereby when said uncorrugated tubing is corrugated the resulting corrugations register with the underlying corrugations of said non-faulty corrugated tubing on each side of said exposed core portion.

3. A repair method according to claim 1 in which said fault is located during the sheathing process and in which said uncorrugated tubing is formed after such discovery by continuing to act on said strip material at said tube forming position and said tube thereby formed at said tube gripping position but ceasing to act on said tube at said corrugated position until said fault and a portion of uncorrugated tube passes said corrugating position, thereafter removing the faulted section adjacent said corrugating position with said uncorrugated tube remaining extending between said gripping and corrugating position to serve as said uncorrugated tubing.

References Cited by the Examiner

UNITED STATES PATENTS

| | | | |
|---|---|---|---|
| 2,817,363 | 12/1957 | Penrose | 138—122 |
| 2,867,897 | 1/1959 | Emanueli | 29—401 |
| 3,023,300 | 2/1962 | Lehnert | 219—60 |
| 3,026,924 | 3/1962 | Lunt et al. | 29—202.5 |
| 3,132,415 | 5/1964 | Johnson et al. | 29—401 |

WHITMORE A. WILTZ, *Primary Examiner.*